US010221961B2

(12) United States Patent
Collison et al.

(10) Patent No.: US 10,221,961 B2
(45) Date of Patent: Mar. 5, 2019

(54) ANTI-ROTATION ASSEMBLIES FOR USE WITH FLUID VALVES (71) Applicant: Fisher Controls International LLC, Marshalltown, IA (US)

(72) Inventors: Randall Scott Collison, Bondurant, IA (US); Chad Michael Engle, Marshalltown, IA (US); Christine Rae Hodny, Aberdeen, SD (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 15/468,915

(22) Filed: Mar. 24, 2017

(65) Prior Publication Data
US 2017/0198832 A1 Jul. 13, 2017

Related U.S. Application Data (63) Continuation of application No. 14/849,482, filed on Sep. 9, 2015, now Pat. No. 9,664,290, which is a (Continued)

(51) Int. Cl.
*F16K 1/50* (2006.01)
*F16K 41/10* (2006.01)
(Continued)

(52) U.S. Cl.
CPC .............. *F16K 41/10* (2013.01); *F16K 1/50* (2013.01); *F16K 3/26* (2013.01); *F16K 31/508* (2013.01);
(Continued)

(58) Field of Classification Search
CPC .......... F16K 1/50; F16K 31/508; F16K 41/10; F16K 41/08; F16K 1/123; F16K 3/24;
(Continued)

(56) References Cited

U.S. PATENT DOCUMENTS 949,115 A 2/1910 Davey
984,243 A 2/1911 Schmid et al.
(Continued)

FOREIGN PATENT DOCUMENTS

DE 1019878 10/1957
DE 2219285 11/1972
(Continued)

OTHER PUBLICATIONS

International Searching Authority, "Search Report" issued in connection with International Patent Application No. PCT/US2013/023063, dated May 6, 2013, 3 pages.
(Continued)

*Primary Examiner* — Reinaldo Sanchez-Medina
*Assistant Examiner* — Hailey K Do
(74) *Attorney, Agent, or Firm* — Hanley, Flight and Zimmerman, LLC (57) ABSTRACT Anti-rotation assemblies for use with fluid valves are disclosed. An example apparatus includes a retainer collar coupled at an end of a plug, the plug including a plug collar around which the retainer collar is disposed, the plug and the retainer collar being substantially flush at an interface between the plug and the retainer collar, a fastener extending transversely through the retainer collar and the plug collar to couple the retainer collar at the end of the plug, when the retainer collar and the plug are disposed within a valve body, a stem extends through the retainer collar and the plug to enable the plug to be moved within the valve body; and an anti-rotation collar to receive the retainer collar, the anti-rotation collar coupled at an end of a cage, the anti-rotation collar and the retainer collar having corresponding non-circular cross-sections to inhibit rotation of the retainer collar and the plug when the plug is moved within the valve body.

22 Claims, 4 Drawing Sheets

Related U.S. Application Data continuation of application No. 13/362,750, filed on Jan. 31, 2012, now Pat. No. 9,206,909.

(51) Int. Cl.

| | | |
|---|---|---|
| *F16K 3/26* | (2006.01) | |
| *F16K 31/50* | (2006.01) | |
| *F16K 3/24* | (2006.01) | |
| *F16K 3/22* | (2006.01) | |

(52) U.S. Cl.
CPC .............. *F16K 3/22* (2013.01); *F16K 3/24* (2013.01); *F16K 3/246* (2013.01); *F16K 3/262* (2013.01); *F16K 3/267* (2013.01); *Y10T 137/86775* (2015.04); *Y10T 137/86791* (2015.04); *Y10T 137/86799* (2015.04)

(58) Field of Classification Search
CPC ............ F16K 3/26; F16K 3/262; F16K 3/267; E21B 34/02; Y10T 137/86791; Y10T 137/86799; Y10T 137/86778; Y10T 137/86718; Y10T 137/86767
USPC ................. 251/318, 264–269, 335.1–335.3, 251/281–283, 63.5, 122, 144, 274, 251/332–334, 356–358; 137/510, 625.12, 137/625.16, 625.37, 625.39, 625.35, 137/625.38
See application file for complete search history.

(56) References Cited

U.S. PATENT DOCUMENTS

| | | | | |
|---|---|---|---|---|
| 1,001,970 | A | | 8/1911 | McCarthy |
| 1,728,077 | A | | 9/1929 | Moyer |
| 1,730,305 | A | | 10/1929 | Stancu, Jr. |
| 2,078,553 | A | | 4/1937 | Allen et al. |
| 2,132,199 | A | | 10/1938 | Yancey |
| 3,206,165 | A | | 9/1965 | Salmon et al. |
| 3,892,384 | A | | 7/1975 | Myers |
| 3,934,814 | A | | 1/1976 | Orszak |
| 3,973,591 | A | | 8/1976 | Kalb |
| 4,054,979 | A | | 10/1977 | Massey, Jr. |
| 4,232,695 | A | * | 11/1980 | Roberge .................. F16K 1/443 137/1 |
| 4,346,728 | A | | 8/1982 | Sulzer |
| 4,383,553 | A | | 5/1983 | Platt |
| 4,483,512 | A | | 11/1984 | Drapeau |
| 4,523,436 | A | | 6/1985 | Schedel et al. |
| 4,616,804 | A | | 10/1986 | Sano et al. |
| 4,671,490 | A | | 6/1987 | Kolenc et al. |
| 4,763,690 | A | | 8/1988 | Martin |
| 4,834,133 | A | | 5/1989 | LaCoste et al. |
| 5,056,759 | A | * | 10/1991 | Schlesch ................. F16K 41/10 251/267 |
| 5,074,519 | A | | 12/1991 | Pettus |
| 5,706,856 | A | | 1/1998 | Lancaster |
| 5,722,638 | A | | 3/1998 | Miller et al. |
| 5,820,106 | A | | 10/1998 | Wurangian |
| 6,460,567 | B1 | * | 10/2002 | Hansen, III ............. F16K 31/04 137/554 |
| 7,216,844 | B2 | | 5/2007 | Malina et al. |
| 8,267,372 | B2 | | 9/2012 | Masamura |
| 9,206,909 | B2 | | 12/2015 | Collison et al. |
| 9,664,290 | B2 | | 5/2017 | Collison et al. |
| 2003/0024580 | A1 | | 2/2003 | Bohaychuk |
| 2006/0049375 | A1 | | 3/2006 | Gossett |
| 2012/0012772 | A1 | | 1/2012 | Moore et al. |
| 2012/0012882 | A1 | | 1/2012 | Shiue et al. |
| 2013/0193356 | A1 | | 8/2013 | Collison et al. |
| 2015/0377363 | A1 | | 12/2015 | Collison et al. |

FOREIGN PATENT DOCUMENTS

| | | |
|---|---|---|
| DE | 102009008493 | 8/2010 |
| EP | 0134866 | 3/1985 |
| FR | 439617 | 6/1912 |
| FR | 543733 | 9/1922 |
| GB | 613520 | 11/1948 |
| GB | 641754 | 8/1950 |
| GB | 1236631 | 6/1971 |
| GB | 2256028 | 11/1992 |

OTHER PUBLICATIONS

International Searching Authority, "Written Opinion" issued in connection with International Patent Application No. PCT/US2013/023063, dated May 6, 2013, 7 pages.

International Searching Authority, "International Preliminary Report on Patentability" issued in connection with International Patent Application No. PCT/US2013/023063, dated Aug. 5, 2014, 8 pages.

Fisher, "Type SS-114 Control Valve," Instruction Manual, Feb. 1997, 8 pages.

United States Patent and Trademark Office, "Non-Final Office Action," issued in connection with U.S. Appl. No. 13/362,750, dated Feb. 5, 2014, 23 pages.

United States Patent and Trademark Office, "Final Office Action," issued in connection with U.S. Appl. No. 13/362,750, dated Jul. 28, 2014, 21 pages.

United States Patent and Trademark Office, "Non-Final Office Action," issued in connection with U.S. Appl. No. 13/362,750, dated Dec. 29, 2014, 23 pages.

United States Patent and Trademark Office, "Final Office Action," issued in connection with U.S. Appl. No. 13/362,750, dated Apr. 1, 2015, 19 pages.

United States Patent and Trademark Office, "Non-Final Office Action," issued in connection with U.S. Appl. No. 13/362,750, dated Aug. 18, 2015, 25 pages.

United States Patent and Trademark Office, "Advisory Action," issued in connection with U.S. Appl. No. 13/362,750, dated May 28, 2015, 3 pages.

United States Patent and Trademark Office, "Advisory Action," issued in connection with U.S. Appl. No. 13/362,750, dated Dec. 1, 2014, 3 pages.

United States Patent and Trademark Office, "Non-final Office Action," issued in connection with U.S. Appl. No. 14/849,482, dated Jan. 18, 2017, 45 pages.

United States Patent and Trademark Office, "Notice of Allowance," issued in connection with U.S. Appl. No. 14/849,482, dated Mar. 20, 2017, 20 pages.

Federal Service for Intellectual Property of Russia, "Office Action," issued in connection with Russian Patent Application No. 2014132566, dated May 17, 2016, 5 pages.

Australia Patent Office, "Patent Examination Report," issued in connection with Australian Patent Application No. 2013215482, dated Aug. 16, 2016, 3 pages.

State Intellectual Property Office of the People's Republic of China, "Notification of First Office Action," issued in connection with Chinese Patent Application No. 201310036603.2, dated Feb. 24, 2016, 14 pages (includes English translation).

Japanese Patent Office, "English Translation of Notice of First Office Action," issued in connection with Japanese Patent Application No. 2014-555595, dated Nov. 28, 2016, 5 pages.

State Intellectual Property Office of the People's Republic of China, "Notification of Second Office Action," issued in connection with Chinese Patent Application No. 201310036603.2, dated Oct. 19, 2017, 14 pages (includes English translation).

State Intellectual Property Office of the People's Republic of China, "Notification of Third Office Action," issued in connection to Chinese Patent Application No. 201310036603.2, dated Mar. 23, 2018, 14 pages (includes English translation).

Patent Office of the Cooperation Council for the Arab States of the Gulf, "First Examination Report," issued in connection with International Application No. GC 2013-23449, dated Oct. 25, 2016, 5 pages.

(56) References Cited

OTHER PUBLICATIONS

Patent Office of the Cooperation Council for the Arab States of the Gulf, "Second Examination Report," issued in connection with International Application No. GC 2013-23449, dated May 2, 2017, 4 pages.

Mexican Institute of Industrial Property, "First Office Action," issued in connection with International application No. MX/a/2014/009299, dated Aug. 15, 2016, 2 pages.

* cited by examiner

ANTI-ROTATION ASSEMBLIES FOR USE WITH FLUID VALVES

RELATED APPLICATIONS

This patent arises from a continuation of U.S. patent application Ser. No. 14/849,482, which was filed on Sep. 9, 2015, which is a continuation of U.S. application Ser. No. 13/362,750, which was filed on Jan. 31, 2012, now U.S. Pat. No. 9,206,909. Priority is claimed to U.S. patent application Ser. No. 14/849,482 and U.S. patent application Ser. No. 13/362,750. U.S. patent application Ser. No. 14/849,482 and U.S. patent application Ser. No. 13/362,750 are hereby incorporated herein by reference in their entireties.

FIELD OF THE DISCLOSURE

This patent relates generally to fluid valves and, more particularly, to anti-rotation assemblies for use with fluid valves.

BACKGROUND

Process control systems use a variety of field devices to control and/or monitor process parameters. Field devices, such as fluid control valves, control the flow of fluid through a passageway of a valve. A control valve typically employs an actuator to move a flow control member relative to an orifice of the valve to allow fluid flow through the passageway of the valve and to restrict or prevent fluid flow through the passageway of the valve. The actuator is operatively coupled to the flow control member via a valve stem.

Some process control devices often include seals to prevent fluid leakage. For example, some known fluid valves employ a bellows-type seal to prevent fluid leakage to the environment along the valve stem. However, the seals (e.g., bellows seals) are often subjected to stresses during operation that can significantly reduce the operating life of the seal. For example, fluid flowing through the passageway of the valve body may impart torsion loads to a bellows-type seal. Such torsion loads may significantly reduce the cycle life of the bellows-type seal.

SUMMARY

An example apparatus includes a retainer collar coupled at an end of a plug, the plug including a plug collar around which the retainer collar is disposed, the plug and the retainer collar being substantially flush at an interface between the plug and the retainer collar, a fastener extending transversely through the retainer collar and the plug collar to couple the retainer collar at the end of the plug, when the retainer collar and the plug are disposed within a valve body, a stem extends through the retainer collar and the plug to enable the plug to be moved within the valve body; and an anti-rotation collar to receive the retainer collar, the anti-rotation collar coupled at an end of a cage, the anti-rotation collar and the retainer collar having corresponding non-circular cross-sections to inhibit rotation of the retainer collar and the plug when the plug is moved within the valve body.

DETAILED DESCRIPTION

Example anti-rotation assemblies disclosed herein significantly reduce or prevent twisting rotation of a valve stem and/or a flow control member relative to a valve body of a fluid valve. As a result, the anti-rotation assemblies disclosed herein may be used to prevent or significantly reduce torsional loads imparted to a bellows-type seal. For example, the anti-rotation assemblies disclosed herein significantly prevent a process fluid (e.g., a relatively high pressure process fluid) flowing through a passageway of a valve from twisting or turning a flow control member and/or a valve stem relative to a longitudinal axis of the flow control member when the flow control member is positioned away from a valve seat of the fluid valve. Limiting rotation of the valve stem and/or the flow control member significantly extends an operating life of a bellows-type seal.

Additionally or alternatively, the example anti-rotation assemblies disclosed herein enable use of a balanced flow control member. In particular, the anti-rotation assemblies disclosed herein define a seal gland to receive a seal that prevents fluid flow or leakage between the flow control member and a cage and/or a valve body when the flow control member is in a closed position. A balanced flow control member requires less thrust to move between an open position and a closed position. As a result, a relatively smaller actuator may be employed.

An example anti-rotation assembly disclosed herein includes an anti-rotation retainer and an anti-rotator. The anti-rotation retainer is coupled (e.g., fixed) to a flow control member. The anti-rotation retainer includes an opening to receive at least a portion of a flow control member or valve plug (e.g., a balanced valve plug) and an outer surface defining a first engaging surface or keyed portion. Also, at least a portion of the anti-rotator also includes an engaging surface or keyed portion. The engaging surface or keyed portion of the anti-rotator is complementary to the engaging surface or keyed portion of the anti-rotation retainer to provide a substantially tight fit connection between the anti-rotator and the anti-rotation retainer when the anti-rotator is coupled to the anti-rotation retainer.

When coupled to a fluid valve, the anti-rotator engages the anti-rotation retainer to prevent the anti-rotation retainer and, thus, the flow control member from rotating or twisting relative to a longitudinal axis of the anti-rotation retainer and/or the flow control member. In some examples, the engaging surface of the anti-rotation retainer may be formed along a portion of an outer surface of the anti-rotation retainer and the engaging surface of the anti-rotator may be formed along a portion of an inner surface of the anti-rotator. The respective engaging surfaces of the anti-rotator and the anti-rotation retainer may be one or more substantially flat-shaped or straight surfaces.

Figure 1:
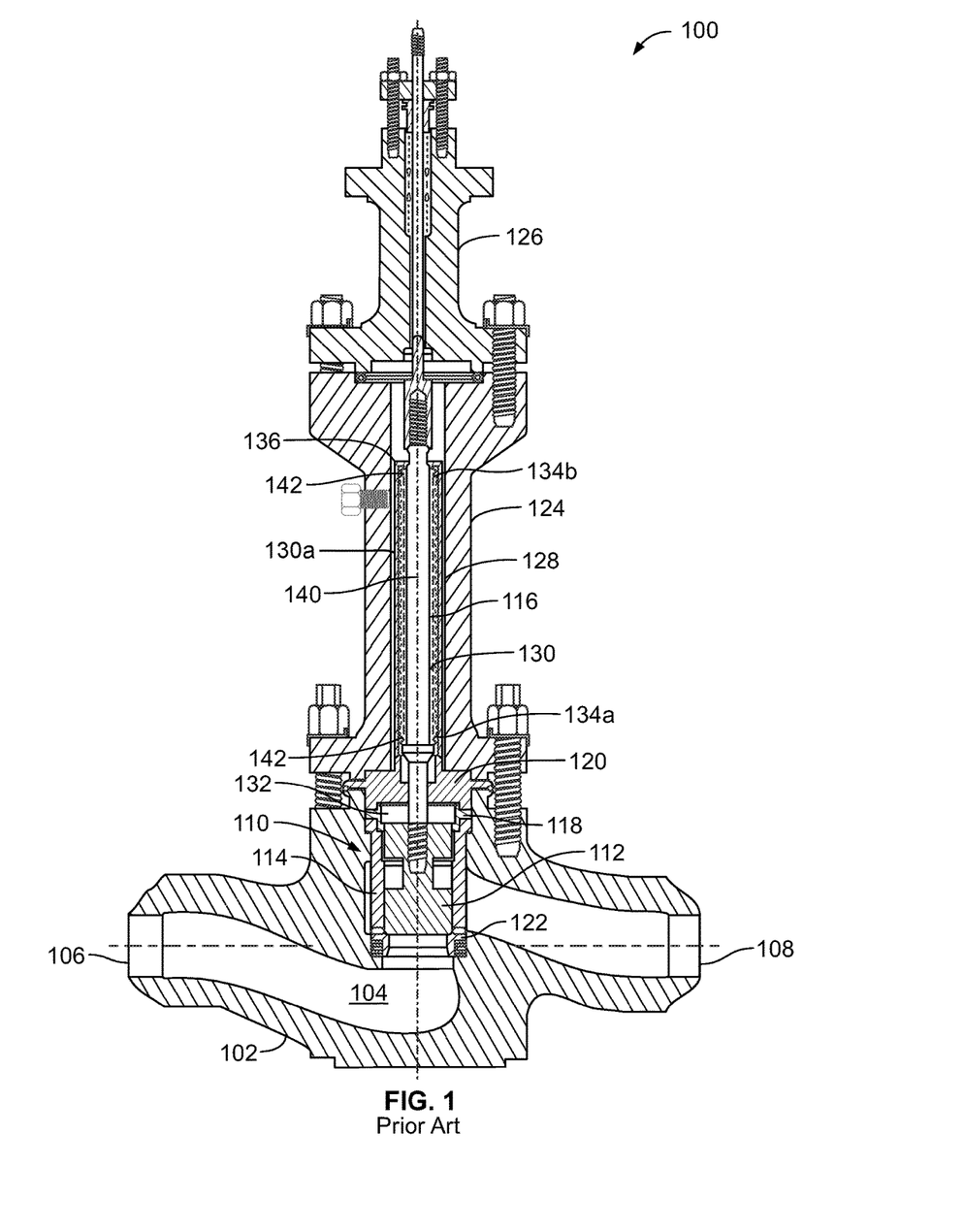
FIG. 1 is a cross-sectional view of a known fluid valve.

Before discussing an example anti-rotation assembly disclosed herein, a brief description of a known fluid valve 100 is provided in FIG. 1. The fluid valve 100 of FIG. 1 includes a valve body 102 defining a fluid flow passageway 104 between an inlet 106 and an outlet 108. A flow control assembly 110 controls fluid flow through the passageway 104. As shown in FIG. 1, the flow control assembly 110 includes a valve plug 112, a cage 114, a valve stem 116, an anti-rotator 118, and a bellows seal flange 120.

The valve plug 112 is operatively coupled to the valve stem 116 and moves in a first direction away from a valve seat 122 to allow fluid flow through the passageway 104 and moves in a second direction toward the valve seat 122 to restrict or prevent fluid flow through the passageway 104. The valve plug 112 of FIG. 1 is an unbalanced valve plug. Thus, a relatively large actuator may be required to move the valve plug 112 to a closed position and/or provide sufficient thrust to the valve plug 112 to provide a relatively tight seal when valve plug 112 sealingly engages the valve seat 122 in a closed position. A bonnet extension 124 couples the valve body 102 to a bonnet 126, which couples the valve body 102 to an actuator (not shown).

In FIG. 1, the bonnet extension 124 includes an aperture 128 to slidably receive the valve stem 116. In addition, a bellows seal 130 is disposed within the aperture 128 of the bonnet extension 124 to prevent fluid in a chamber 132 of the valve body 102 from leaking to the environment along the valve stem 116. As shown, the bellows seal 130 has a first end 134a coupled to the bellows seal flange 120 and a second end 134b coupled to an upper portion or connector 136 of a bellows tubing 130a. The connector 136 is coupled to the bellows tubing 130a via, for example, welding, and includes a central aperture to slidably receive the valve stem 116. The bellows tubing 130a is coupled to the bellows flange 120 via, for example, welding.

In operation, an actuator (not shown) moves the valve plug 112 relative to the valve seat 122 in a rectilinear motion along a longitudinal axis 140 to control the fluid flow through the passageway 104. In addition, the bellows seal 130 compresses and expands axially in a direction along the longitudinal axis 140 when the valve stem 116 moves between a first position at which the valve plug 112 sealingly engages the valve seat 122 and a second position at which the valve plug 112 is away from the valve seat 122 (e.g., an open position). Thus, during each operational cycle, the bellows seal 130 is subjected to a load (e.g., an axial load) and, thus, a stress which affects the cycle-life and/or useful life of the bellows seal 130.

The bellows seal 130 has one or more convolutions 142 that axially compress or expand along the longitudinal axis 140 depending upon the movement of valve stem 116. To form the convolutions 142, the bellows seal 130 is formed or stamped from rolling a flat sheet or foil into a tube which is then longitudinally fusion welded. Alternatively, the seal 130 may be formed by welding washer-like plates of thin metal together at both the inner and outer circumference of the washers. The welded portions of the convolutions are susceptible to damage when torsional loads (e.g., relatively large torsional loads or forces) are imparted to the bellows seal 130. In some examples, the torsional loads may cause the bellows seal 130 to fail prior to a rated cycle-life of the bellows seal 130 (e.g., an operating life of a bellows seal that is not subjected to torsional loads).

For example, during operation, a relatively high pressure process fluid may impart a torsional load on the valve plug 112 when the valve plug 112 is away from the valve seat 122. Because the valve stem 116 is fixedly coupled to the valve plug 112 at the first end 134a, the torsion load imparted to the valve plug 112 causes the valve stem 116 to twist or turn relative to the longitudinal axis 140. In turn, the first end 134a between the bellows seal 130 and the valve stem 116 causes the bellows seal 130 to experience a torsional load. During operation, the anti-rotator 118 reduces rotational movement of the valve plug 112 relative to the longitudinal axis 140, which reduces such twisting of the bellows seal 130. However, as noted above, the valve plug 112 is an unbalanced valve plug. Employing a balanced valve plug in combination with the anti-rotator 118 of FIG. 1 may affect (e.g., reduce) a shut-off classification of the fluid valve 100 because fluid leakage may occur between the cage 114 and the valve plug 112 when the valve plug 112 is sealingly engaged with the valve seat 122 (e.g., in a closed position).

Figure 2:
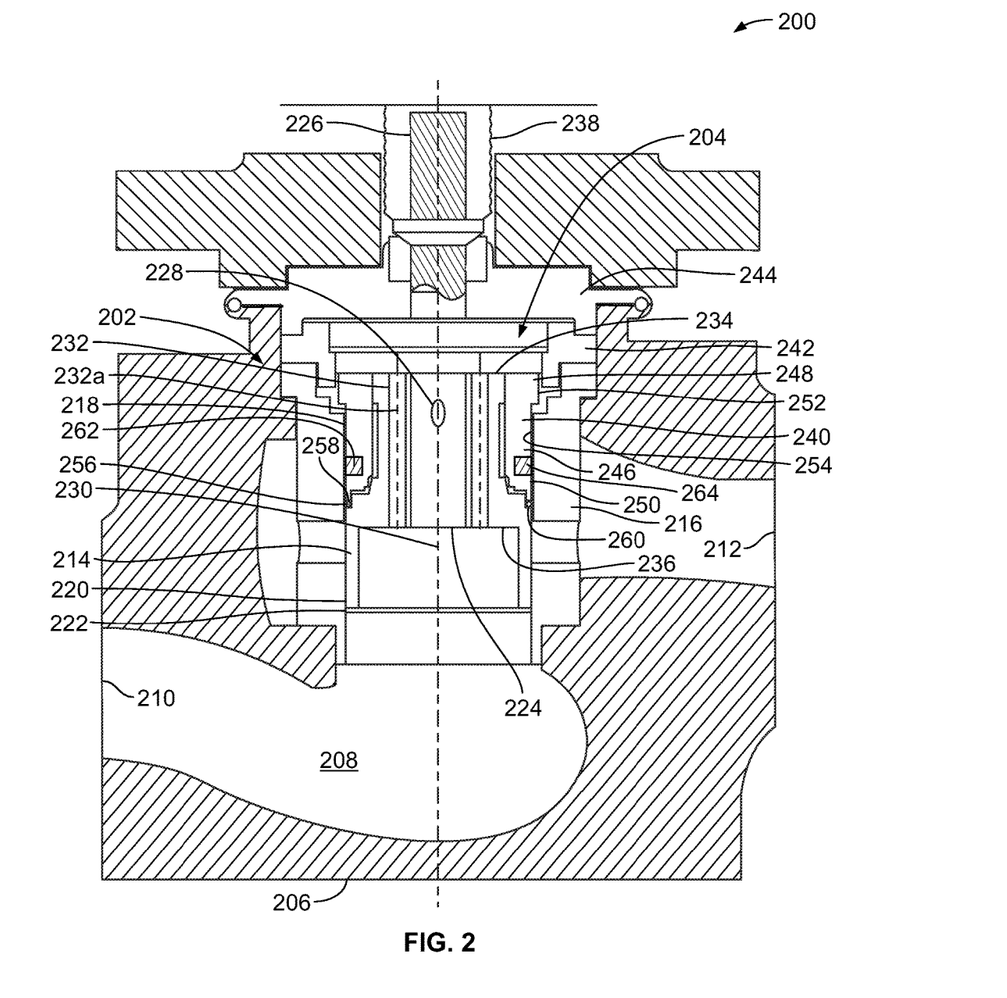
FIG. 2 is a cross-sectional view of an anti-rotation retainer assembly that may be used with the fluid valve of FIG. 1.

FIG. 2 is a cross-sectional view of an example fluid valve 200 having a flow control assembly 202 that includes an example anti-rotation assembly 204 in accordance with the teachings disclosed herein. For example, the flow control assembly 202 and/or the anti-rotation assembly 204 may replace the flow control assembly 110 of FIG. 1 and/or may retrofit a fluid valve in the field such as, for example, the fluid valve 100 of FIG. 1.

Referring to FIG. 2, the fluid valve 200 includes a valve body 206 defining a fluid flow passageway 208 between an inlet 210 and an outlet 212. The flow control assembly 202 is disposed within the passageway 208 to control fluid flow through the passageway 208 between the inlet 210 and the outlet 212. The flow control assembly 202 of FIG. 2 includes a flow control member 214 (e.g., a valve plug), a cage 216 and the anti-rotation assembly 204. More specifically, the cage 216 includes an opening 218 to slidably receive at least a portion of the flow control member 214 and is disposed between the inlet 210 and the outlet 212 to impart certain flow characteristics to the fluid flowing through the passageway 208 (e.g., to control capacity, reduce noise, reduce cavitation, etc.).

As shown in FIG. 2, the flow control member 214 includes a sealing surface 220 that engages a valve seat 222 integrally formed with the cage 216 when the flow control member 214 sealingly engages the valve seat 222 (e.g., a closed position). Thus, the flow rate permitted through the fluid valve 200 is controlled by the position of the flow control member 214 relative to the valve seat 222.

The flow control member 214 is a balanced flow control member and includes a central opening 224 to receive (e.g., threadably receive) a valve stem 226. To further prevent rotation of the flow control member 214 relative to the valve stem 226, the flow control member 214 includes an opening 228 to receive a fastener or pin (not shown). To balance the flow control member 214, a plurality of through passageways 232 is formed between an upper surface 234 and a lower surface 236 of the flow control member 214. Each of the passageways 232 includes an axis 232a that is substantially parallel to a longitudinal axis 230 of the flow control member 214 and enables fluid flow between the lower and upper surfaces 234 and 236 of the flow control member 214. As a result of the balanced flow control member 214 and in contrast to the fluid valve 100 of FIG. 1, a relatively smaller actuator providing less thrust may be employed to move the flow control member 214 between an open position and a closed position and/or to move the flow control member 214 into sealing engagement with the valve seat 222 to prevent or restrict fluid flow through the passageway 208. The fluid valve 200 of FIG. 2 also includes a bellows seal 238 that surrounds the valve stem 226 to prevent leakage of process fluid to the environment along the valve stem 226.

The anti-rotation assembly 204 is disposed in the passageway 208 of the valve body 206. The example anti-rotation assembly 204 includes an anti-rotation retainer, insert or guide 240 and an anti-rotator 242. The anti-rotation retainer 240 of FIG. 2 is at least partially disposed in the opening 218 of the cage 216 and the anti-rotator 242 is disposed or captured between the cage 216 and a bellows seal flange 244. In other examples, the cage 216 may be omitted such that the anti-rotator 242 is disposed or captured between the bellows seal flange 244 and the valve body 206. The bellows seal 238 is coupled to the valve stem 226 at a first end and is coupled to a connector such as, for example, the connector 136 of FIG. 1 at a second end of the bellows seal 238 opposite the first end. The anti-rotation assembly 204 prevents or significantly reduces torsional loads from being imparted to the bellows seal 238.

The anti-rotation retainer 240 of the illustrated example includes a first portion or body 246 (e.g., a cylindrical body) and a second portion or flange 248. The body 246 defines a first outer surface portion 250 of the anti-rotation retainer 240 and the flange 248 defines a second outer surface portion 252 of the anti-rotation retainer 240. As shown in FIG. 2, a diameter or size of the flange 248 is greater than a diameter of the body 246. More specifically, the body 246 is at least partially disposed in the opening 218 of the cage 216 and/or slides relative to an inner surface 254 of the opening 218 of cage 216.

As shown in FIG. 2, an end or edge 256 of the body 246 of the anti-rotation retainer 240, the cage 216 and the flow control member 214 define a gland or cavity 258 to receive a seal 260 (e.g., a C-seal) that prevents fluid leakage between the anti-rotation retainer 240 and the cage 216 when the flow control member 214 is in sealing engagement with the valve seat 222. In other examples, however, the body 246 of the anti-rotation retainer 240 and/or the flange 248 may include a groove or channel (e.g., an annular gland) to receive the seal 260. Additionally or alternatively, the outer surface portion 250 defined by the body 246 of the anti-rotation retainer 240 includes an annular gland 262 to receive a piston ring 264 (e.g., a carbon-graphite piston ring) to help maintain alignment of the anti-rotation retainer 240 relative to the cage 216 and/or helps to provide a seal between the anti-rotation retainer 240 and the cage 216. In some examples, the annular gland 262 may receive a seal (e.g., a C-seal).

Figure 3A:
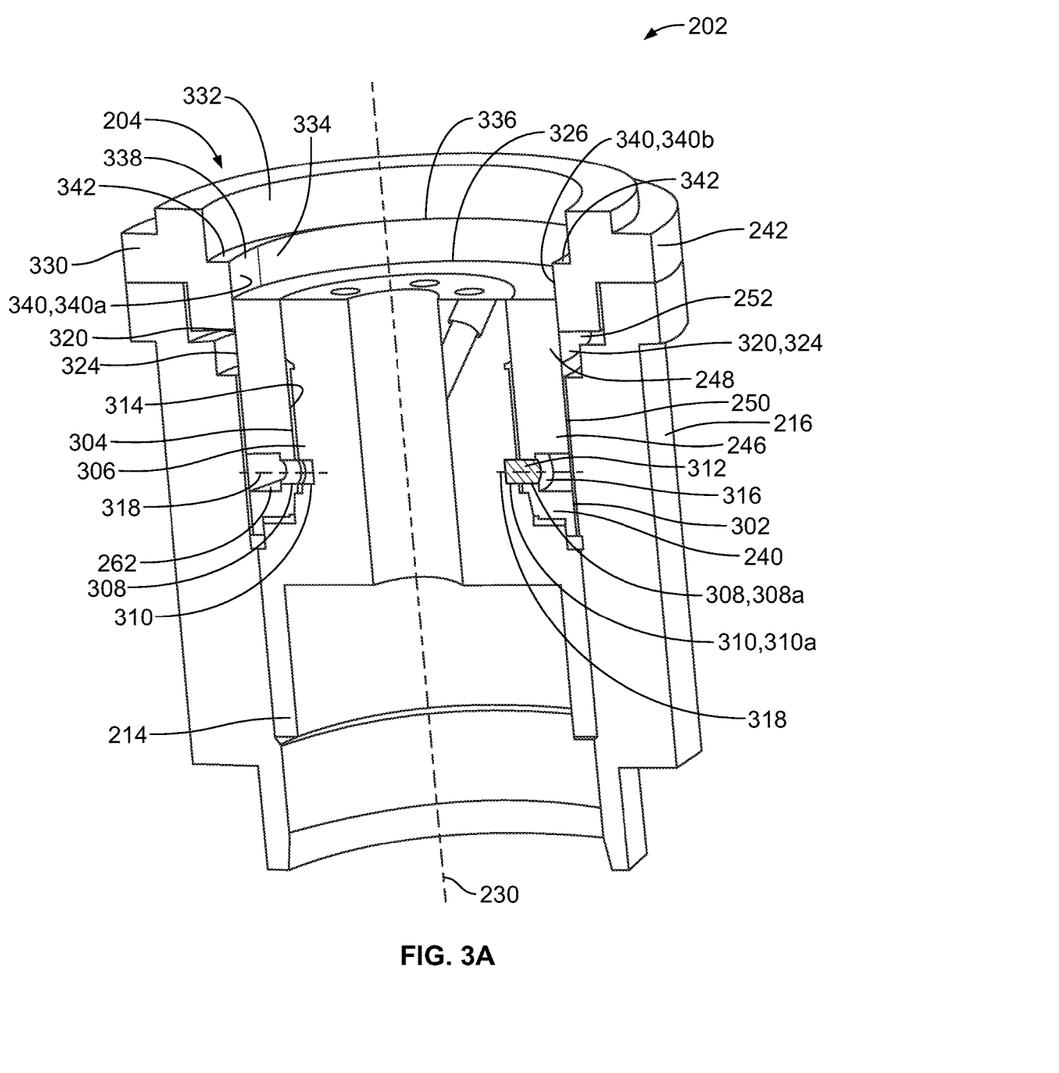
FIG. 3A is a cross-sectional, perspective view of the example anti-rotation assembly of FIG. 2.
Figure 3B:
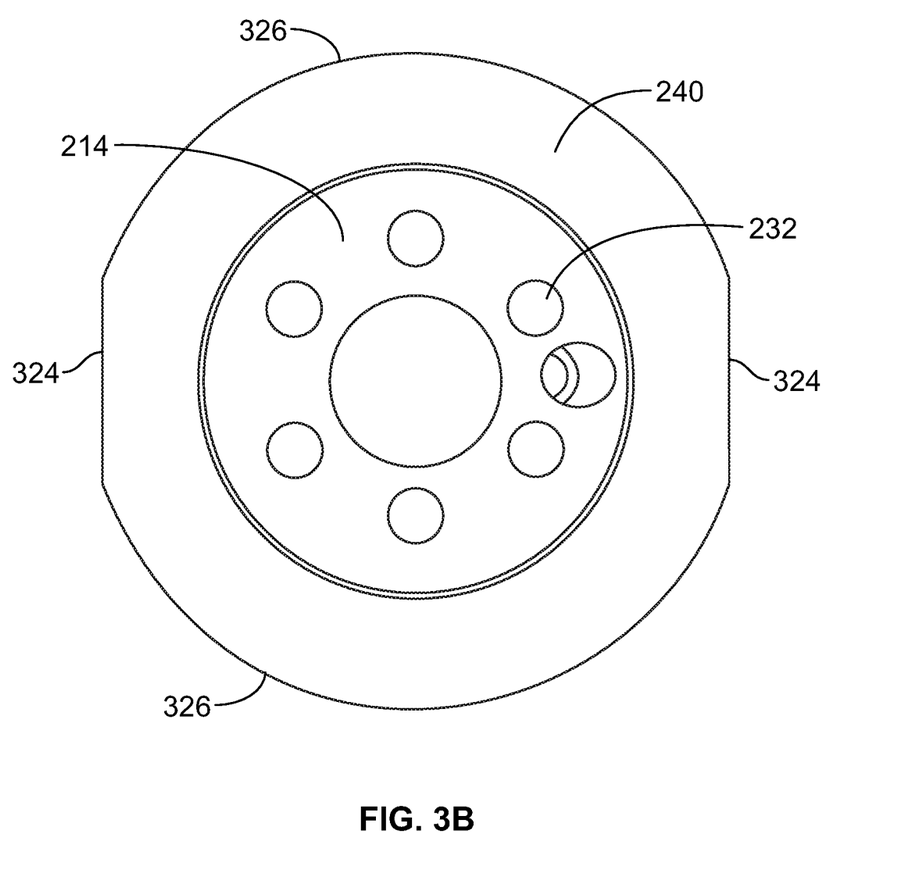
FIG. 3B is a plan view of the example anti-rotation assembly of FIGS. 2 and 3A.

FIG. 3A is a cross-sectional perspective view of the anti-rotation assembly 204 of FIG. 2. FIG. 3B is a plan view of the anti-rotation retainer 240 coupled to the flow control member 214. Referring to FIGS. 3A and 3B, the anti-rotation retainer 240 is a cylindrical body 302 having a central opening 304 that is sized or configured to receive at least a portion 306 (e.g., a stem portion) of the flow control member 214. In addition, the flow control member 214 is fixedly coupled to the anti-rotation retainer 240. As shown in FIG. 3A, the anti-rotation retainer 240 includes one or more openings 308 that align with respective openings 310 of the flow control member 214. An opening 308a of the anti-rotation retainer 240 and an opening 310a of the flow control member 214 receive a pin 312 to couple (e.g., fixedly couple) the anti-rotation retainer 240 and the flow control member 214 such that the flow control member 214 cannot move (e.g., rotate or slide) relative to the anti-rotation retainer 240. The openings 308 of the anti-rotation retainer 240 are formed between an inner surface 314 of the body 246 and an annular surface 316 that is formed or defined by the annular gland 262 of the body 246. In this example, the openings 308 and 310 include respective axes 318 that are substantially perpendicular to the longitudinal axis 230. In other examples, however, the respective axes 318 of the openings 308 and 310 may be at any angle and/or non-parallel orientation relative to the longitudinal axis 230. Thus, the valve stem 226, the flow control member 214 and the anti-rotation retainer 240 are fixedly coupled to function as a unitary unit or assembly.

In the illustrated example, the anti-rotation retainer 240 defines an engaging surface or keyed portion 320 of the anti-rotation retainer 240. The engaging surface or keyed portion 320 is formed along at least a portion of the outer surfaces 250 and/or 252 of the anti-rotation retainer 240. In particular, the engaging surface 320 as shown in FIG. 3A is disposed or formed in proximity to or adjacent an outer peripheral edge of the flange 248. More specifically, the engaging surface 320 of the illustrated example includes one or more substantially flat-shaped or straight portions or surfaces 324. As most clearly shown in FIG. 3B, the substantially flat-shaped portions 324 are disposed between arcuate or curved surfaces 326 of the anti-rotation retainer 240 or the flange 248. For example, the anti-rotation retainer 240 may be formed as a cylindrical body and the substantially flat-shaped portions 324 may be formed subsequently via, for example, machining.

The anti-rotator 242 is a cylindrical body 330 having a central opening 332. In particular, the central opening 332 defines an inner surface 334 having at least a stepped portion 336. Similar to the anti-rotation retainer 240, the anti-rotator 242 includes an engaging surface or keyed portion 338. More specifically, engaging surface 338 is formed along at least a portion of the inner surface 334 of the anti-rotator 242. In the illustrated example, the engaging surface 338 of the anti-rotator 242 includes one or more substantially flat-shaped or straight surfaces or portions 340. As shown in FIG. 3A, the one or more substantially flat-shaped portions 340 of the anti-rotator includes a wall or projection 342 formed on the inner surface 334 that projects toward the longitudinal axis 230 where the wall 342 defines the substantially flat-shaped portion 340. In this example, the anti-rotator 242 includes two substantially flat-shaped portions 340a and 340b radially spaced approximately 180 degrees relative to the longitudinal axis 230. However, in other examples, the anti-rotator 242 may include only one substantially flat-shaped portion 340 or engaging surface 338 and/or more than two flat-shaped portions 340 or engaging surfaces 338 disposed on the inner surface 334 of the anti-rotator 242. As shown, the engaging surfaces 338 and/or walls 342 are formed between arcuate or curved surfaces 344 of the inner surface 334 of the anti-rotator 242.

The engaging surface 320 of the anti-rotation retainer 240 engages or contacts (e.g., directly contacts) the engaging surface 338 of the anti-rotator 242. In the illustrated example, both the substantially flat-shaped surfaces 324 and 340 of the respective anti-rotation retainer 240 and the anti-rotator 242 have faces or planes that are substantially parallel to the longitudinal axis 230. In addition, the anti-rotation retainer 240 can slide relative to the anti-rotator 242 when the flow control member 214 moves relative to the valve seat 222 between the open position and the closed position. In other examples, the engaging surfaces 320 and 338 of the respective anti-rotation retainer 240 and the anti-rotator 242 may have different shapes or configurations other than the substantially flat-shaped surfaces 324 and 340 described in FIGS. 3A and 3B. For example, the wall 342 may include a track and/or a slot that engages or slides relative to a complementary slot and/or track formed on the flange 248 of the anti-rotation retainer 240 (e.g., a tongue-and-groove connection). In yet other examples, the engaging surface 320 of the anti-rotation retainer 240 and the engaging surface 338 of the anti-rotator 242 may be a splined connection. For example, the engaging surfaces 320 and 338 may include splines that extend along an entire circumference or perimeter of the anti-rotation retainer 240 and the anti-rotator 242.

In operation, when coupled to the anti-rotation retainer 240, the anti-rotator 242 prevents rotation of the anti-rotation retainer 242 and, thus, the flow control member 214 relative to the longitudinal axis 230 (i.e., the anti-rotation retainer 240 and/or the cage 216). In particular, the engaging surface 320 of the anti-rotation retainer 240 is complementary to the engaging surface 338 of the anti-rotator 242 to provide a substantially tight fit connection between the anti-rotator 242 and the anti-rotation retainer 240. More specifically, the substantially flat-shaped portions 324 and 340 of the respective anti-rotation retainer 240 and the anti-rotator 242 engage to prevent rotation of the anti-rotation retainer 240 relative to the longitudinal axis 230 when the anti-rotation retainer 240 is disposed within the fluid valve 200. Thus, the flow control member 214, via the anti-rotation assembly 204, prevents twisting or torsional loads applied to the flow control member 214 from being conveyed to the bellows seal 238, thereby increasing the operating life of the bellows seal 238.

As set forth herein, an example anti-rotation assembly includes an anti-rotation retainer to couple to a flow control member of a valve, and an anti-rotator to engage the anti-rotation retainer, where the anti-rotator is to prevent rotation of the anti-rotation retainer relative to a longitudinal axis of the anti-rotation retainer when the anti-rotation retainer is disposed in the valve.

In some examples, the anti-rotator includes a first engaging surface to engage a second engaging surface of the anti-rotation retainer. In some such examples, the first engaging surface of the anti-rotator is complementary to the second engaging surface of the anti-rotation retainer. In such some examples, the first engaging surface is formed along at least a portion of an inner surface of the anti-rotator and the second engaging surface is formed along at least a portion of an outer surface of the anti-rotation retainer. In some examples, the first engaging surface and the second engaging surface each includes one or more substantially flat-shaped portions. In some examples, the anti-rotator includes a cylindrical body having a central opening to define the inner surface, where the inner surface has the one or more substantially flat-shaped portions. In some examples, at least one of the substantially flat-shaped portions of the anti-rotator includes a wall projecting toward the longitudinal axis, where the wall defines the substantially flat-shaped portions. In some examples, the anti-rotator includes two substantially flat-shaped portions radially spaced approximately 180 degrees relative to the longitudinal axis. In some examples, the one or more substantially flat-shaped surfaces of the anti-rotation retainer are disposed between arcuate surfaces. In some examples, the anti-rotation retainer includes a cylindrical body and a flange, where the flange defines the second engaging surface and the body defines an outer surface portion adjacent the flange. In some examples, the second engaging surface of the anti-rotation retainer has a diameter that is greater than a diameter of the outer surface portion. In some examples, the anti-rotation retainer includes a central opening to receive at least a portion of the flow control member. In some examples, the anti-rotation assembly further includes a cage having an opening to slidably receive at least a portion of the anti-rotation retainer and the flow control member. In some examples, the anti-rotation assembly further includes a seal, where the anti-rotation retainer is to retain the seal in the valve. In some examples, the seal is disposed between an edge of the anti-rotation retainer, the flow control member and the cage.

An example anti-rotation assembly includes an anti-rotation retainer having an opening to receive at least a portion of a balanced valve plug and an outer surface defining a first engaging surface and an anti-rotator having a central opening defining an inner surface, where the inner surface has a second engaging surface, and the first engaging surface is complementary to the second engaging surface, where the first engaging surface is to engage the second engaging surface when the anti-rotation retainer is coupled to the anti-rotator to prevent rotation of the anti-rotation retainer relative to the anti-rotator.

In some examples, the first engaging surface includes one or more substantially flat-shaped surfaces disposed along a portion of the outer surface of the anti-rotation retainer and the second engaging surface includes one or more substantially flat-shaped surfaces formed along a portion of the inner surface of the anti-rotator. In some examples, the anti-rotation assembly further includes a balanced valve plug coupled to the anti-rotation retainer via a pin such that rectilinear movement of the balanced valve plug relative to a longitudinal axis of the anti-rotation retainer causes the anti-rotation retainer to move with the balanced valve plug. In some examples, the anti-rotation assembly further includes a cage having a central opening to slidably receive at least a portion anti-rotation retainer and the balanced valve plug.

Another example rotation assembly includes means for retaining a flow control member of a valve, the means for retaining to be disposed in a valve, the means for retaining having first means for engaging and means for preventing rotation of the means for retaining, the means for retaining having second means for engaging, the first means for engaging to engage the second means for engaging to prevent rotation of the means for retaining relative to the means for preventing rotation relative to a longitudinal axis of the means for retaining.

Another example ant-rotation assembly includes a cage to be disposed inside a valve body, where the cage defines a first aperture having a substantially circular cross-section, a plug disposed within the first aperture of the cage throughout a stroke of the valve, where an interaction between the plug and the first aperture to guide movement of the plug throughout the stroke of the valve, the plug having a substantially circular cross-section, an anti-rotation retainer coupled to the plug, where the anti-rotation retainer has an exterior surface defining a non-circular cross-section and an interior surface at least partially surrounding the plug, an anti-rotator coupled to an end of the cage, where the anti-rotator defines a second aperture having a non-circular cross-section, and where an engagement between the anti-rotator and the exterior surface to reduce rotation of the anti-rotation retainer and the plug relative to a longitudinal axis of the anti-rotation retainer, a seal coupled to at least one of the plug or the anti-rotation retainer, where the seal is to sealingly engage the cage to substantially prevent fluid flow between the seal and the cage, and a transverse bore extending through the anti-rotation retainer and the plug, where a fastener is to be disposed in the transverse bore to couple the plug and the anti-rotation retainer, and where the anti-rotation retainer defines an opening of the transverse bore, where the anti-rotation retainer defines a groove into which the seal is disposed, and where the transverse bore intersects the groove at the opening of the transverse bore.

In some examples, the seal is to cover the opening of the transverse bore. In some examples, the anti-rotation assembly further includes a second transverse bore extending through the anti-rotation retainer and the plug, where a second fastener is to be disposed in the second transverse bore to couple the plug and the anti-rotation retainer, and where the anti-rotation retainer defining an opening of the second transverse bore. In some such examples, the first and second transverse bores are disposed along a transverse axis of the anti-rotation retainer. In some examples, the example anti-rotation assembly includes a stem to be coupled within an aperture of the plug. In some examples, the anti-rotator includes a first engaging surface to engage a second engaging surface of the exterior surface of the anti-rotation retainer. In some examples, the first engaging surface of the anti-rotator is complementary to the second engaging surface of the anti-rotation retainer. In some examples, the first engaging surface is formed along at least a portion of the interior surface of the anti-rotator and the second engaging surface is formed along at least a portion of the exterior surface of the anti-rotation retainer.

In some examples, wherein each of the first engaging surface and the second engaging surface includes a substantially flat-shaped portion. In some examples, the anti-rotator includes a cylindrical body having the second aperture that defines the interior surface, where the interior surface has the substantially flat-shaped portion. In some examples, the substantially flat-shaped portion of the anti-rotator includes a wall projecting toward the longitudinal axis, where the wall defines the substantially flat-shaped portion. In some examples, the anti-rotator includes two substantially flat-shaped portions radially spaced approximately 180 degrees relative to the longitudinal axis. In some examples, the substantially flat-shaped portion of the anti-rotation retainer is disposed between arcuate surfaces. In some examples, the anti-rotation retainer includes a cylindrical body and a flange, where the flange defines the second engaging surface and the body defining an outer surface portion adjacent the flange. In some examples, the second engaging surface of the anti-rotation retainer has a diameter that is greater than a diameter of the outer surface portion. In some examples, the anti-rotation retainer includes a central opening to receive at least a portion of the plug. In some examples, the cage is to slidably receive at least a portion of the anti-rotation retainer.

In some examples, an interaction between the seal and the groove is to retain the seal relative to the anti-rotation retainer and the plug. In some examples, the seal is disposed at an interface between the anti-rotation retainer and the plug. In some examples, the exterior surface of the anti-rotation retainer defines a first keyed surface, the second aperture of the anti-rotator defines a second keyed surface, where the anti-rotator is to be disposed within the valve, and where the anti-rotator is to receive the plug and the anti-rotation retainer, where the first keyed surface is to engage the second keyed surface to reduce rotation of the anti-rotation retainer relative to the anti-rotator, and the seal surrounds the plug, where the seal is disposed at an interface between the plug and the anti-rotation retainer. In some examples, the first keyed surface includes one or more substantially flat-shaped surfaces disposed along a portion of the exterior surface of the anti-rotation retainer and the second keyed surface includes one or more substantially flat-shaped surfaces formed along a portion of an inner surface of the anti-rotator. In some examples, the fastener includes a pin to cause the anti-rotation retainer to move with the plug throughout a stroke of the valve. In some examples, the first aperture of the cage is to slidably guide the anti-rotation retainer and the plug, where an interaction between the seal and the cage is to substantially prevent fluid flow between the seal and the cage.

In some examples, the anti-rotation assembly includes a valve body defining a flow aperture, where the cage is disposed within the flow aperture, where the plug is movable relative to the flow aperture to control fluid flow through the valve, where the anti-rotation retainer is directly coupled to the plug and the anti-rotator is directly coupled to the cage, and the seal is disposed between at least one of the cage and the anti-rotation retainer or the anti-rotator. In some examples, the seal surrounds a collar of the plug, where the seal is disposed at an interface between the plug and the anti-rotation retainer. In some examples, the seal is to be loaded into engagement with an inner surface of the cage to substantially prevent fluid flow between at least one of the plug or the anti-rotation retainer and the cage. In some examples, the plug comprises a balanced plug. In some examples, the anti-rotation assembly includes a second seal coupled to the plug or the anti-rotation retainer to substantially prevent fluid flow between the second seal and the cage. In some examples, a portion of the plug defining the transverse bore comprises a blind hole.

Another example apparatus includes a valve body defining a fluid flow passageway between an inlet and an outlet, a cage disposed in the fluid flow passageway, a plug disposed in the cage, a retainer collar coupled at an end of the plug, where an exterior surface of the retainer collar includes a first engagement surface having a first non-circular cross-section, and an anti-rotation collar coupled at an end of the cage, where the anti-rotation collar has a second engagement surface defining an aperture to receive the retainer collar, where the aperture has a second non-circular cross-section, where the engagement surfaces interact to inhibit rotation of the retainer collar and the plug.

In some examples, the retainer collar includes a first transverse bore and the plug includes a second transverse bore, where a fastener is disposed in the first and second transverse bores to couple the plug and the retainer collar. In some examples, the retainer collar defines a groove into which a seal is to be disposed, where the first transverse bore intersects the groove at an opening of the first transverse bore. In some examples, an interaction between the seal and the groove is to retain the seal relative to the retainer collar and the plug. In some examples, the seal is to cover the opening of the first transverse bore. In some examples, the first engagement surface and the second engagement surface include corresponding flat surfaces that interact to inhibit rotation of the retainer collar relative to the anti-rotation collar. In some examples, the first engagement surface or the second engagement surface includes splines and the other of the first engagement surface or the second engagement surface includes grooves to receive the splines to inhibit rotation of the retainer collar relative to the anti-rotation collar. In some examples, the first engagement surface or the second engagement surface includes a slot and the other of the first engagement surface or the second engagement surface includes a protrusion to be received by the slot to inhibit rotation of the retainer collar relative to the anti-rotation collar. In some examples, the retainer collar includes a cylindrical body and a flange extending from the cylindrical body, where the flange defines the first engagement surface. In some examples, an exterior surface of the cylindrical body is flush with an exterior surface of the plug. In some examples, the plug includes a step, where an end of the retainer collar is received in the step. In some examples, the aperture is a first aperture, where the retainer collar including a second aperture to receive the end of the plug. In some examples, a third aperture is defined by the plug, where the second and third apertures are coaxial, and where the third aperture receives a stem and the second aperture to surround the stem.

Another example apparatus includes a first collar to be coupled to a plug, where an exterior surface of the first collar has a first keyed surface, and where an interior surface of the first collar at least partially surrounds the plug, and a second collar to be coupled to a cage, where the second collar defines an aperture, and where the aperture is at least partially defined by a second keyed surface, where the second collar is to receive the first collar, and where the first keyed surface to interact with the second keyed surface to inhibit rotation of the first collar relative to the second collar.

In some examples, the second collar to be disposed within a fluid passageway of a valve. In some examples, the first keyed surface includes one or more substantially flat surfaces and the second keyed surface includes one or more substantially flat surfaces. In some examples, a pin is disposed in a first transverse bore of the first collar and a second transverse bore of the plug, where the pin is to couple the first collar and the plug. In some examples, the cage defines a second aperture to receive and slidably guide the plug, where an interaction between a seal and the cage substantially prevents fluid flow between the seal and the cage and to align the first collar relative to the cage. In some examples, the first keyed surface includes opposing first flat surfaces to engage respective opposing second flat surfaces of the second keyed surface, where the opposing first and second surfaces inhibit rotation of the first collar relative to the second collar. In some examples, the second collar includes an internal flange defining the second keyed surface.

Another example apparatus includes a valve body defining a fluid flow passageway between an inlet and an outlet, a cage to be disposed in the fluid flow passageway, where the cage includes an interior surface defining an aperture having a first non-circular cross-section, and a plug disposed in the aperture of the cage, where an exterior surface of the plug defines a second non-circular cross-section corresponding to the first non-circular cross-section, and where an interaction between the first and second non-circular cross-sections prevents rotation of the plug relative to the cage.

In some examples, the plug includes a first portion and a second portion, where the first portion at least partially surrounds the second portion and defines the second non-circular cross-section, and where the second portion receives a stem. In some examples, the cage includes a first portion and a second portion, where the first portion defines the aperture having the first non-circular cross-section, and the second portion receives the plug.

Another example apparatus includes a valve body defining a fluid flow passageway between an inlet and an outlet, a cage, a plug disposed in the cage, a plug collar coupled at an end of the plug, where an exterior surface of the plug collar has a first non-circular cross-section, and a cage collar coupled at an end of the cage, where the cage collar defines an aperture having a second non-circular cross-section, the plug collar disposed in the aperture, and where an engagement between the exterior surface of the plug collar and an interior surface defining the aperture to prevent rotation of the plug as the plug moves relative to a valve seat to control fluid flow between the inlet and the outlet.

In some examples, the plug collar includes a flange, where the flange has a first keyed surface corresponding to a second keyed surface of the cage collar, and where the second keyed surface is disposed in the aperture. In some examples, the first keyed surface and the second keyed surface include interacting flat structures to prevent rotation of the plug collar relative to the cage collar. In some examples, the plug collar includes a first transverse bore to intersect a second transverse bore of the plug, where a fastener is disposed in the first transverse bore to enable the plug and plug collar to move together relative to the cage and cage collar. In some examples, an opening of the first transverse bore defines a groove surrounding the plug collar, where a seal is disposed within the groove to prevent fluid flow between the cage and the plug collar. In some examples, the aperture is a first aperture and the plug includes a second aperture, where the first and second apertures are coaxial, and where a stem is received within the second aperture, where the first aperture surrounds the stem.

Another example apparatus includes a valve body defining a flow aperture, a cage disposed within the flow aperture, a plug movable relative to the flow aperture to control fluid flow through the valve, where the plug is slidably guided by the cage throughout a stroke of the valve, and means for preventing rotation of the plug relative to a longitudinal axis of the valve, where the means for preventing rotation is disposed at an end of the plug and an end of the cage. In some examples, the means for preventing rotation includes first and second corresponding keyed surfaces that interact to prevent rotation of the plug relative to the cage. In some examples, the plug is coupled to a retainer collar including the first keyed surface and the cage is coupled to an anti-rotation collar including the second keyed surface.

An example apparatus includes a valve body defining a fluid flow passageway between an inlet and an outlet; a cage disposed in the fluid flow passageway; a plug disposed in the cage; a retainer collar coupled at an end of the plug, the retainer collar includes a first transverse bore and the plug includes a second transverse bore, a fastener disposed in the first and second transverse bores to couple the plug and the retainer collar, an exterior surface of the retainer collar including a first engagement surface having a first non-circular cross-section; and an anti-rotation collar coupled at an end of the cage, the anti-rotation collar having a second engagement surface defining an aperture to receive the retainer collar, the aperture having a second non-circular cross-section, the engagement surfaces to interact to inhibit rotation of the retainer collar and the plug, the retainer collar defines a groove into which a seal is to be disposed, the first transverse bore intersects the groove at an opening of the first transverse bore.

In some examples, an interaction between the seal and the groove is to retain the seal relative to the retainer collar and the plug. In some examples, the seal is to cover the opening of the first transverse bore. In some examples, the first engagement surface and the second engagement surface include corresponding flat surfaces that interact to inhibit rotation of the retainer collar relative to the anti-rotation collar. In some examples, the first engagement surface or the second engagement surface includes splines and the other of the first engagement surface or the second engagement surface includes grooves to receive the splines to inhibit rotation of the retainer collar relative to the anti-rotation collar.

In some examples, the first engagement surface or the second engagement surface includes a slot and the other of the first engagement surface or the second engagement surface includes a protrusion to be received by the slot to inhibit rotation of the retainer collar relative to the anti-rotation collar. In some examples, the retainer collar includes a cylindrical body and a flange extending from the cylindrical body, the flange defining the first engagement surface. In some examples, an exterior surface of the cylindrical body is flush with an exterior surface of the plug. In some examples, the plug includes a step, an end of the retainer collar to be received in the step. In some examples, the aperture is a first aperture, the retainer collar including a second aperture to receive the end of the plug. In some examples, the apparatus includes a third aperture defined by the plug, the second and third apertures being coaxial, the third aperture to receive a stem and the second aperture to surround the stem.

An example apparatus includes a valve body defining a fluid flow passageway between an inlet and an outlet; a cage disposed in the fluid flow passageway; a plug disposed in the cage; a retainer collar coupled at an end of the plug, the retainer collar including a second aperture to receive the end of the plug, an exterior surface of the retainer collar including a first engagement surface having a first non-circular cross-section; and an anti-rotation collar coupled at an end of the cage, the anti-rotation collar having a second engagement surface defining a first aperture to receive the retainer collar, the first aperture having a second non-circular cross-section, the engagement surfaces to interact to inhibit rotation of the retainer collar and the plug; and a third aperture defined by the plug, the second and third apertures being coaxial, the third aperture to receive a stem and the second aperture to surround the stem.

In some examples, the retainer collar includes a first transverse bore and the plug includes a second transverse bore, a fastener disposed in the first and second transverse bores to couple the plug and the retainer collar. In some examples, the retainer collar defines a groove into which a seal is to be disposed, the first transverse bore intersects the groove at an opening of the first transverse bore. In some examples, an interaction between the seal and the groove is to retain the seal relative to the retainer collar and the plug. In some examples, the seal is to cover the opening of the first transverse bore. In some examples, the first engagement surface and the second engagement surface include corresponding flat surfaces that interact to inhibit rotation of the retainer collar relative to the anti-rotation collar. In some examples, the first engagement surface or the second engagement surface includes splines and the other of the first engagement surface or the second engagement surface includes grooves to receive the splines to inhibit rotation of the retainer collar relative to the anti-rotation collar.

In some examples, the first engagement surface or the second engagement surface includes a slot and the other of the first engagement surface or the second engagement surface includes a protrusion to be received by the slot to inhibit rotation of the retainer collar relative to the anti-rotation collar. In some examples, the retainer collar includes a cylindrical body and a flange extending from the cylindrical body, the flange defining the first engagement surface. In some examples, an exterior surface of the cylindrical body is flush with an exterior surface of the plug. In some examples, the plug includes a step, an end of the retainer collar to be received in the step.

An example apparatus includes a first collar to be coupled to a plug, an exterior surface of the first collar having a first keyed surface, an interior surface of the first collar to at least partially surround the plug; a second collar to be coupled to a cage, the second collar defining an aperture, the aperture at least partially defined by a second keyed surface, the second collar to receive the first collar, the first keyed surface to interact with the second keyed surface to inhibit rotation of the first collar relative to the second collar; and a pin disposed in a first transverse bore of the first collar and a second transverse bore of the plug, the pin to couple the first collar and the plug the cage defining a second aperture to receive and slidably guide the plug, an interaction between a seal and the cage to substantially prevent fluid flow between the seal and the cage and to align the first collar relative to the cage.

In some examples, the first keyed surface includes opposing first flat surfaces to engage respective opposing second flat surfaces of the second keyed surface, the opposing first and second surfaces to inhibit rotation of the first collar relative to the second collar. In some examples, the second collar includes an internal flange defining the second keyed surface. In some examples, the apparatus includes a valve, the second collar to be disposed within a fluid passageway of the valve. In some examples, the first keyed surface includes one or more substantially flat surfaces and the second keyed surface includes one or more substantially flat surfaces. In some examples, the plug collar includes a flange, the flange having a first keyed surface corresponding to a second keyed surface of the cage collar, the second keyed surface disposed in the aperture. In some examples, the first keyed surface and the second keyed surface include interacting flat structures to prevent rotation of the plug collar relative to the cage collar.

An example apparatus includes a valve body defining a fluid flow passageway between an inlet and an outlet; a cage; a plug disposed in the cage; a plug collar coupled at an end of the plug, an exterior surface of the plug collar having a first non-circular cross-section; and a cage collar coupled at an end of the cage, the cage collar defining an aperture having a second non-circular cross-section, the plug collar disposed in the aperture, an engagement between the exterior surface of the plug collar and an interior surface defining the aperture to prevent rotation of the plug as the plug moves relative to a valve seat to control fluid flow between the inlet and the outlet, wherein the plug collar includes a first transverse bore to intersect a second transverse bore of the plug, a fastener disposed in the first transverse bore to enable the plug and plug collar to move together relative to the cage and cage collar, wherein an opening of the first transverse bore defines a groove surrounding the plug collar, a seal disposed within the groove to prevent fluid flow between the cage and the plug collar. In some examples, the aperture is a first aperture and the plug includes a second aperture, the first and second apertures being coaxial, a stem being received within the second aperture, the first aperture surrounding the stem.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus, comprising:
a retainer collar removably coupled at an end of a plug, the plug including a plug collar, the retainer collar circumscribing the plug collar, the plug and the retainer collar being substantially flush at an interface between the plug and the retainer collar, a fastener extending transversely through the retainer collar and the plug collar relative to a stem to couple the retainer collar at the end of the plug, when the retainer collar and the plug are disposed within a valve body, the stem extends through the retainer collar and the plug to enable the plug to be moved within the valve body; and
an anti-rotation collar to receive the retainer collar, the anti-rotation collar removably coupled at an end of a cage, the anti-rotation collar and the retainer collar having corresponding non-circular cross-sections taken along a plane transverse to a longitudinal axis of the stem to inhibit rotation of the retainer collar and the plug when the plug is moved within the valve body.

2. The apparatus of claim 1, wherein the plug is a pressure balanced plug.

3. The apparatus of claim 1, wherein the plug defines passageways to be disposed around the stem when the stem extends through the retainer collar and the plug, the passageways to enable the plug to be pressure balanced.

4. The apparatus of claim 1, further including the valve body and a bonnet, the bonnet coupled to the valve body to urge the anti-rotation collar and the cage toward a seat engagable by the plug.

5. The apparatus of claim 1, wherein the corresponding non-circular cross-sections include corresponding arced surfaces between which corresponding flat surfaces are disposed, an interaction between the corresponding flat surfaces to inhibit rotation of the retainer collar and the plug when the plug is moved within the valve body.

6. The apparatus of claim 1, wherein the interface between the plug and the retainer collar is at an end of plug and an end of the retainer collar.

7. The apparatus of claim 1, wherein a height of the plug is substantially similar to a second height of a plug assembly including the plug and the retainer collar.

8. The apparatus of claim 1, further including a seal carried by one or more of the cage, the anti-rotation collar, the plug, or the retainer collar to deter fluid from flowing between the cage and the plug and affecting a pressure-balanced chamber of the valve body when the plug and the cage are disposed within the valve body.

9. The apparatus of claim 1, wherein the plug defines one or more passages to enable fluid to flow through the plug to a pressure balanced chamber of the valve.

10. An apparatus, comprising:
a retainer collar removably coupled at an end of a pressure-balanced plug, the plug including a plug collar, the retainer collar circumscribing the plug collar, the plug and the retainer collar being substantially flush at an interface between the plug and the retainer collar, a fastener extending transversely through the retainer collar and the plug collar relative to a stem to couple the retainer collar at the end of the plug, when the retainer collar and the plug are disposed within a valve body, the stem extends through the retainer collar and the plug to enable the plug to be moved within the valve body;
an anti-rotation collar to receive the retainer collar, the anti-rotation collar removably coupled at an end of a cage, the anti-rotation collar and the retainer collar having corresponding non-circular cross-sections taken along a plane transverse to a longitudinal axis of the stem to inhibit rotation of the retainer collar and the plug when the plug is moved within the valve body; and
a seal between the plug and the cage, the seal to deter fluid from flowing between the cage and the plug and affecting a pressure-balanced chamber of the valve body when the plug and the cage are disposed within the valve body.

11. An apparatus, comprising:
a retainer collar coupled at an end of a plug, the plug including a plug collar around which the retainer collar is disposed, the plug and the retainer collar being substantially flush at an interface between the plug and the retainer collar, a fastener extending transversely through the retainer collar and the plug collar to couple the retainer collar at the end of the plug, when the retainer collar and the plug are disposed within a valve body, a stem extends through the retainer collar and the plug to enable the plug to be moved within the valve body;
an anti-rotation collar to receive the retainer collar, the anti-rotation collar coupled at an end of a cage, the anti-rotation collar and the retainer collar having corresponding non-circular cross-sections to inhibit rotation of the retainer collar and the plug when the plug is moved within the valve body; and
a first seal and a second seal, the first seal disposed between the interface of the plug and the retainer collar to deter fluid flow between plug and the retainer collar when the plug engages a seat, the second seal to deter fluid flow between the cage and the plug when the plug engages the seat.

12. The apparatus of claim 11, wherein the second seal is to guide movement of the retainer collar relative to the cage.

13. The apparatus of claim 11, wherein the first seal is disposed in a first groove defined by the cage and the retainer collar, the second seal is disposed in a second groove defined by the retainer collar, and the fastener extends through the second groove.

14. The apparatus of claim 13, wherein the second seal at least partially covers the fastener.

15. An apparatus, comprising:
a cage disposed in a valve body;
a pressure balanced plug movable within the cage, via a stem, to control fluid flow through the valve body;
a bellows seal surrounding the stem to deter fluid from exiting the valve body;
means for reducing a torsional load imparted on the bellows seal, the means for reducing the torsional load including first and se and corresponding keyed surfaces that interact to prevent rotation of the plug relative to the cage, the plug coupled to a retainer collar including the first keyed surface and the cage coupled to an anti-rotation collar including the second keyed surface, the retainer collar coupled to the plug via a fastener extending transversely through the retainer collar and the plug; and
means for deterring fluid from flowing between the cage and the plug and affecting a pressure-balanced chamber of the valve body, the means for deterring fluid from flowing between the cage and the plug and affecting the pressure-balanced chamber of the valve body disposed in a cavity at least partially defined by the means for reducing the torsional load.

16. The apparatus of claim 15, wherein the anti-rotation collar includes an annular projection to be engaged by a bonnet when the bonnet is coupled to the valve body to urge the cage toward a seat via the anti-rotation.

17. The apparatus of claim 15, wherein the means for deterring fluid from flowing between the cage and the plug and affecting the pressure-balanced chamber of the valve body includes a seal or a piston ring.

18. A method, comprising:
removing a first plug and a first cage from a valve body; and
disposing a plug assembly and a cage assembly in the valve body, the plug assembly including a second plug and a retainer collar coupled at an end of the second plug, the cage assembly including a second cage and an anti-rotation collar coupled at an end of the second cage, a first height of the first plug being substantially similar to a second height of the plug assembly, a third height of the first cage being substantially similar to a fourth height of the cage assembly.

19. The method of claim 18, further including disposing a seal between the second plug and the second cage, the seal to deter fluid from flowing between the second cage and the second plug and affecting a pressure-balanced chamber of the valve body.

20. The method of claim 18, wherein an interaction between the retainer collar and the anti-rotation collar prevents rotation of the second plug relative to the cage.

21. The method of claim 18, further including extending transversely a fastener through the retainer collar and the second plug to couple the retainer collar and the second plug.

22. The method of claim 21, further including covering the fastener with a seal.

* * * * *

UNITED STATES PATENT AND TRADEMARK OFFICE
CERTIFICATE OF CORRECTION

PATENT NO. : 10,221,961 B2
APPLICATION NO. : 15/468915
DATED : March 5, 2019
INVENTOR(S) : Collison et al.

Page 1 of 1

It is certified that error appears in the above-identified patent and that said Letters Patent is hereby corrected as shown below:

In the Claims

Column 16: Claim 15, Line 35, after the word "including" replace "first and se and" with --first and second--

Signed and Sealed this
Twenty-fifth Day of June, 2019

Andrei Iancu
*Director of the United States Patent and Trademark Office*